United States Patent
Onogawa et al.

(10) Patent No.: US 6,948,858 B2
(45) Date of Patent: Sep. 27, 2005

(54) ADAPTER FOR OPTICAL FIBER CONNECTORS HAVING MECHANISM FOR PROTECTING FIBER END WHEN COUPLING WITH FIBER CONNECTOR

(75) Inventors: Akihiro Onogawa, Tokyo (JP); Yasutaka Hiroki, Tokyo (JP); Yuichi Koreeda, Tokyo (JP); Hirotada Kobayashi, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 10/739,313

(22) Filed: Dec. 19, 2003

(65) Prior Publication Data

US 2004/0131315 A1 Jul. 8, 2004

(30) Foreign Application Priority Data

Dec. 27, 2002 (JP) .................................. 2002-381328

(51) Int. Cl.⁷ ................................................ G02B 6/38
(52) U.S. Cl. ......................................... 385/55; 385/58
(58) Field of Search ........................... 385/55, 58, 59, 385/60, 70, 71, 72, 75, 77, 78

(56) References Cited

U.S. PATENT DOCUMENTS

| | | | | |
|---|---|---|---|---|
| 4,753,510 A | * | 6/1988 | Sezerman ................... | 385/61 |
| 5,537,501 A | * | 7/1996 | Iwano et al. ................ | 385/58 |
| 5,647,043 A |   | 7/1997 | Anderson et al. |   |
| 5,937,121 A | * | 8/1999 | Ott et al. ..................... | 385/59 |
| 6,142,676 A | * | 11/2000 | Lu .............................. | 385/60 |
| 6,210,045 B1 | * | 4/2001 | Dean et al. .................. | 385/72 |
| 6,254,278 B1 | * | 7/2001 | Andrews et al. ............ | 385/53 |
| 6,273,619 B1 | * | 8/2001 | Shahid et al. ............... | 385/70 |
| 6,276,840 B1 |   | 8/2001 | Weiss et al. |   |
| 6,334,715 B1 |   | 1/2002 | So et al. |   |
| 6,425,692 B1 | * | 7/2002 | Fujiwara et al. ............ | 385/56 |
| 6,634,796 B2 | * | 10/2003 | de Jong et al. .............. | 385/56 |
| 6,688,781 B2 | * | 2/2004 | Anderson et al. ........... | 385/76 |

FOREIGN PATENT DOCUMENTS

| | | |
|---|---|---|
| EP | 0330231 | 8/1989 |
| EP | 0430107 | 6/1991 |
| JP | 4323607 | 11/1992 |
| JP | 09113750 | 5/1997 |
| JP | 09281358 | 10/1997 |
| JP | 200133658 | 2/2001 |

* cited by examiner

Primary Examiner—Chandrika Prasad
(74) Attorney, Agent, or Firm—Baker Botts L.L.P.

(57) ABSTRACT

An adapter for coupling first and second optical fiber connectors having ferrules, respectively, comprises first and second members and a sleeve. The first and the second members can be detachably coupled to each other. The second member holds the sleeve. To prevent one end of the sleeve from being brought into undesirable contact with end surface of the ferrule of the first optical fiber connector when the first member connected with the first optical fiber connector is coupled with the second member, the first member is formed with first and second positioning holes, while the second member is provided with first and second positioning sticks. The first and the second positioning sticks project beyond the end of the sleeve. The first and the second positioning sticks are inserted into the first and the second positioning holes, respectively, while the ferrule of the first optical fiber connector is suitably inserted into the sleeve when the first and the second members are coupled together.

12 Claims, 11 Drawing Sheets

ADAPTER FOR OPTICAL FIBER CONNECTORS HAVING MECHANISM FOR PROTECTING FIBER END WHEN COUPLING WITH FIBER CONNECTOR

This application claims priority to prior Japanese application JP 2002-381328, the disclosure of which is incorporated herein by reference.

BACKGROUND OF THE INVENTION

This invention relates to an adapter for coupling optical fiber connectors which have ferrules, respectively.

An optical fiber connector typically includes a ferrule, which is a small cylinder and receives and holds the end of an optical fiber. In a typical connection between two optical fibers, a pair of ferrules are butted together. In order to support and hold the suitable butting of the ferrules, an adapter is used. The adapter couples two optical fiber connectors so that optical fibers held by ferrules are suitably aligned with each other. Such an adapter is disclosed in U.S. Pat. No. 5,647,043 or JP-B 3103773.

Another adapter is disclosed in JP-A H04-323607. The adapter is mounted in a backboard of an instrument. One optical fiber connector is fitted to the adapter in the inside of the instrument, wherein that connector is referred to as an internal connector. The other connector to be coupled with the connector is fitted to the adapter in the outside of the instrument, wherein that connector is referred to as an external connector. The external connector can be easily fitted with and removed from the adapter anytime. On the other hand, for removal of the internal connector, the instrument has to be opened. Therefore, the fitting of the internal connector is kept normally for a long time.

For easy maintenance of the ferrule of the internal connector, the adapter of JP-A H04-323607 comprises first and second members which are detachably coupled together. The first member is fixed to the board, while the second member is coupled to the first member. The adapter further comprises a sleeve for positioning the ferrules of the internal and the external connectors. The sleeve is held by the second member. Upon the maintenance of the ferrule of the internal connector, the second member is decoupled from the first member so that the end of the ferrule of the internal connector can be seen from the outside of the instrument.

As an improvement on the adapter of JP-A H04-323607, another adapter is disclosed in JP-B 3000342. According to JP-B 3000342, at least two second members are prepared corresponding to two types of external connectors. The adapter of JP-B 3000342 allows a user to select and change the second member depending on the type of the external connector even after the installation of the instrument.

However, there is one problem that, upon the replacement of the second member of the adapter, sometimes the end portion of the ferrule of the internal connector is not smoothly inserted into the sleeve but is undesirably brought into contact with the end of the sleeve. The undesirable contact damages the ferrule of the internal connector.

SUMMARY OF THE INVENTION

It is an object of the present invention to provide an adapter which can prevent the end of a ferrule of an internal connector from being undesirably brought into contact with the end of a sleeve.

The present invention is applicable to an adapter for coupling first and second optical fiber connectors each of which has a ferrule. An adapter according to the present invention comprises:

a first member, which has first and second ends in a first direction, wherein the first end is formed with a first opening for receiving the first optical fiber connector, the second end is formed with a second opening, the second opening communicates with the first opening in the first direction, the first member is formed with first and second positioning holes, the first and the second positioning holes extend from the second end in the first direction;

a sleeve, which has first and second open ends for receiving the ferrules of the first and the second optical fiber connectors, respectively, so that the ferrules are butted together; and a second member for receiving the second optical fiber connector, wherein the second member holds the sleeve, the sleeve extends in a second direction, the second member is to be detachably coupled to the first member while the first and the second directions are aligned with each other, the second member is provided with first and second positioning sticks, the first and the second positioning sticks extend in the second direction and project beyond the first open end of the sleeve in the second direction, and the first and the second positioning sticks are inserted into the first and the second positioning holes, respectively, when the first and the second members are coupled together.

Preferred developments of the invention will be understood as the description will proceeds herein bellow.

DESCRIPTION OF PREFERRED EMBODIMENTS

Figure 1:
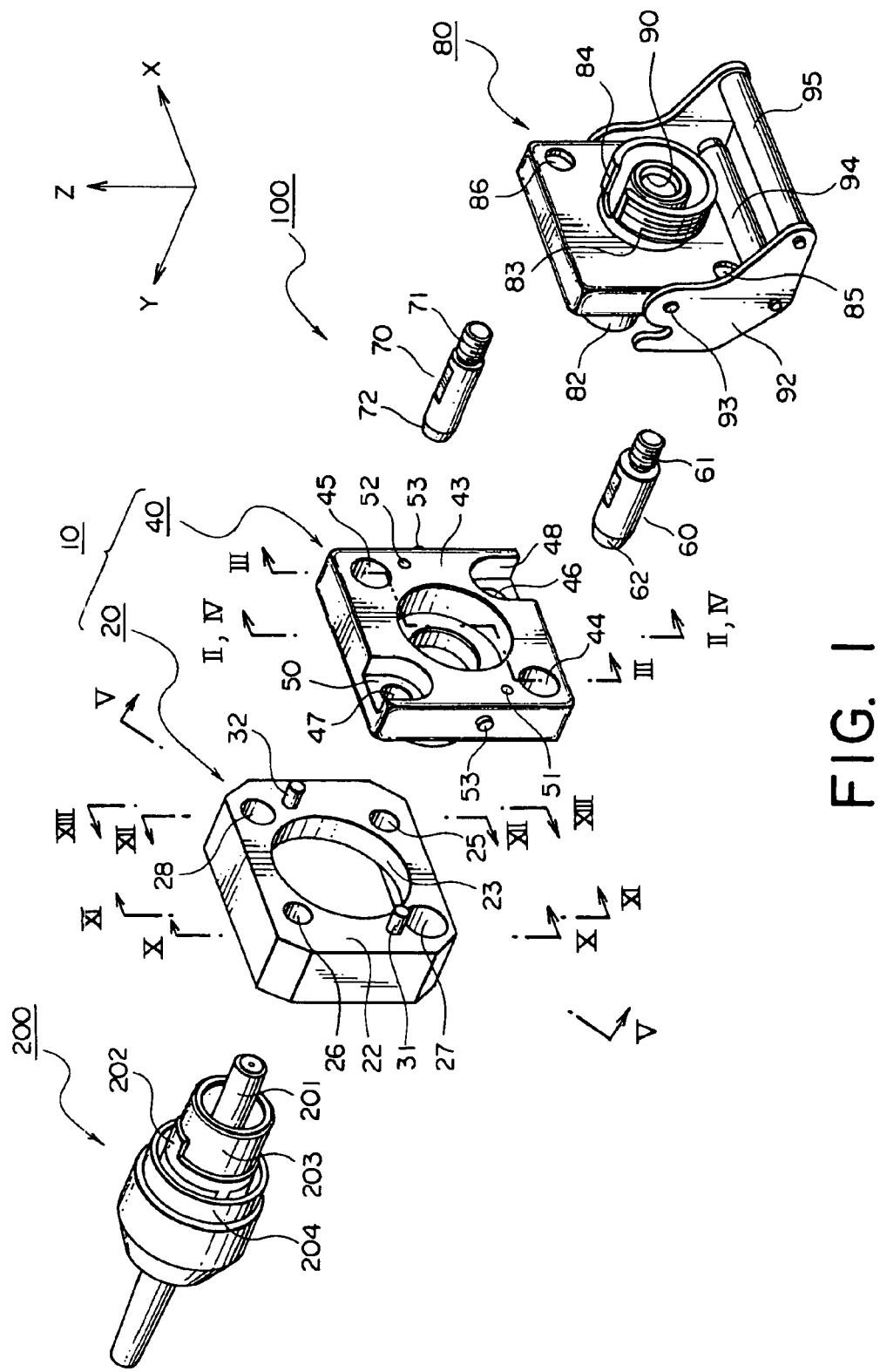
FIG. 1 is an exploded, perspective view showing an adapter according to an embodiment of the present invention.

With reference to FIGS. 1 to 13, an adapter 100 according to an embodiment of the present invention is for coupling two optical fiber connectors 200, wherein only one of them is shown in the drawings while the other one is not shown for the sake of simplification.

Figure 2:
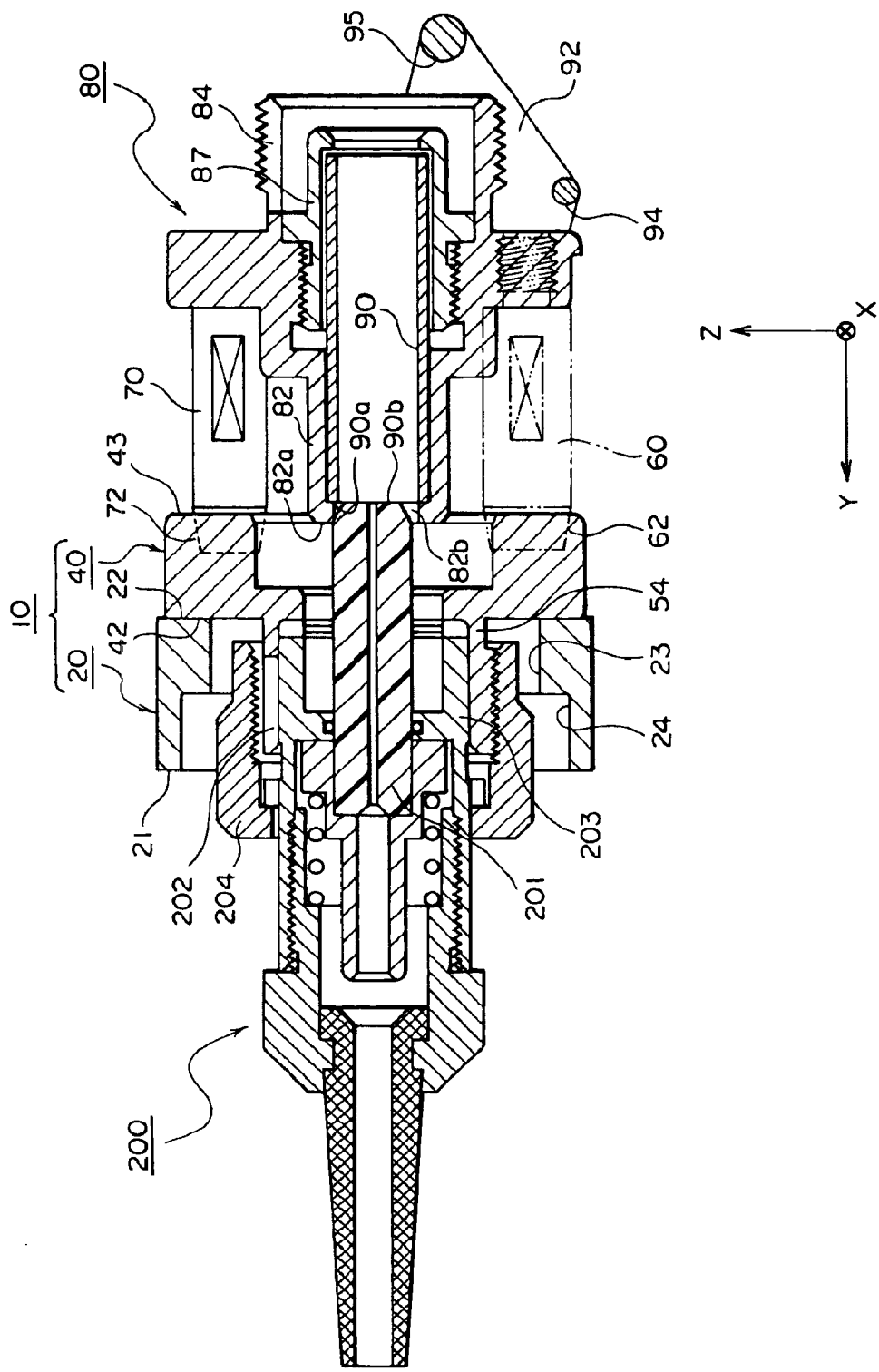
FIG. 2 is a cross sectional view showing the adapter of FIG. 1, taken along lines II—II.

As shown in FIGS. 1 and 2, the optical fiber connector 200 comprises a ferrule 201, a key 202, an inner cylindrical portion 203 and an outer cylindrical portion 204. The ferrule 201 serves to hold an end portion of an optical fiber, which is not shown. The key 202 is used for positioning the optical fiber. For example, the key 202 shows an eccentric direction of the optical fiber. The inner cylindrical portion 203 partially surrounds the ferrule 201. The inner cylindrical portion 203 and the ferrule 201 are fixedly held by the optical fiber connector 200 so that the inner cylindrical portion 203 can not rotate around the ferrule 201. The outer cylindrical portion 204 surrounds the key 202 and the inner cylindrical portion 203. The outer cylindrical portion 204 is held by the optical fiber connector 200 so that the outer cylindrical portion 204 can rotate separately. The inner surface of the outer cylindrical portion 204 is threaded to be screwed to the adapter 100, which will be described later.

As shown in FIGS. 1 and 2, the adapter 100 has a first member 10, which is comprised of first and second parts 20, 40.

As shown in FIGS. 1, 6, and 10 to 13, the first part 20 has first and second ends 21, 22 in a Y-direction. The first part 20 has a generally quadrilateral external form. In detail, the external form is beveled at every corner so that the first part 20 has a modified octagonal external form. In the second end 22 of the first part 20, a circular hole 23 is formed. The circular hole 23 is positioned at the center of the second end 22 in a plane defined by X- and Z-directions. In the first end 21 of the first part 20, another aperture 24 is formed. The aperture 24 has a similar shape to the external form of the first part 20 but is smaller than the external form of the first part 20. The aperture 24 is larger than the circular hole 23 and communicates with the circular hole 23.

The first part 20 is formed with six holes 25 to 30. In this embodiment, all of the holes 25, to 30 are through holes. Each of the holes 25, 26 is a part of a screw hole, which will be described later. The holes 25, 26 have the same size as each other. The holes 25, 26 are arranged diagonally so that the circular hole 23 is positioned between the holes 25, 26. Each of the holes 27, 28 is a part of a first or a second positioning hole, which will be described later. The holes 27, 28 have specific sizes different from each other. In this embodiment, the hole 27 is larger than the hole 28. Namely, the hole 27 has a large diameter than that of the hole 28. Like the holes 25, 26, the holes 27, 28 are arranged diagonally but are on a diagonal line different from that of holes 25, 26. The circular hole 23 is also positioned between the holes 27, 28. The holes 29, 30 are very narrower holes than others. The holes 29, 30 are positioned near to the respective holes 27, 28 and hold projections 31, 32, respectively, as especially shown in FIGS. 1, 10, and 12. The projections 31, 32 extend from the second end 22 of the first part 20 straightly in the Y-direction.

Figure 4:
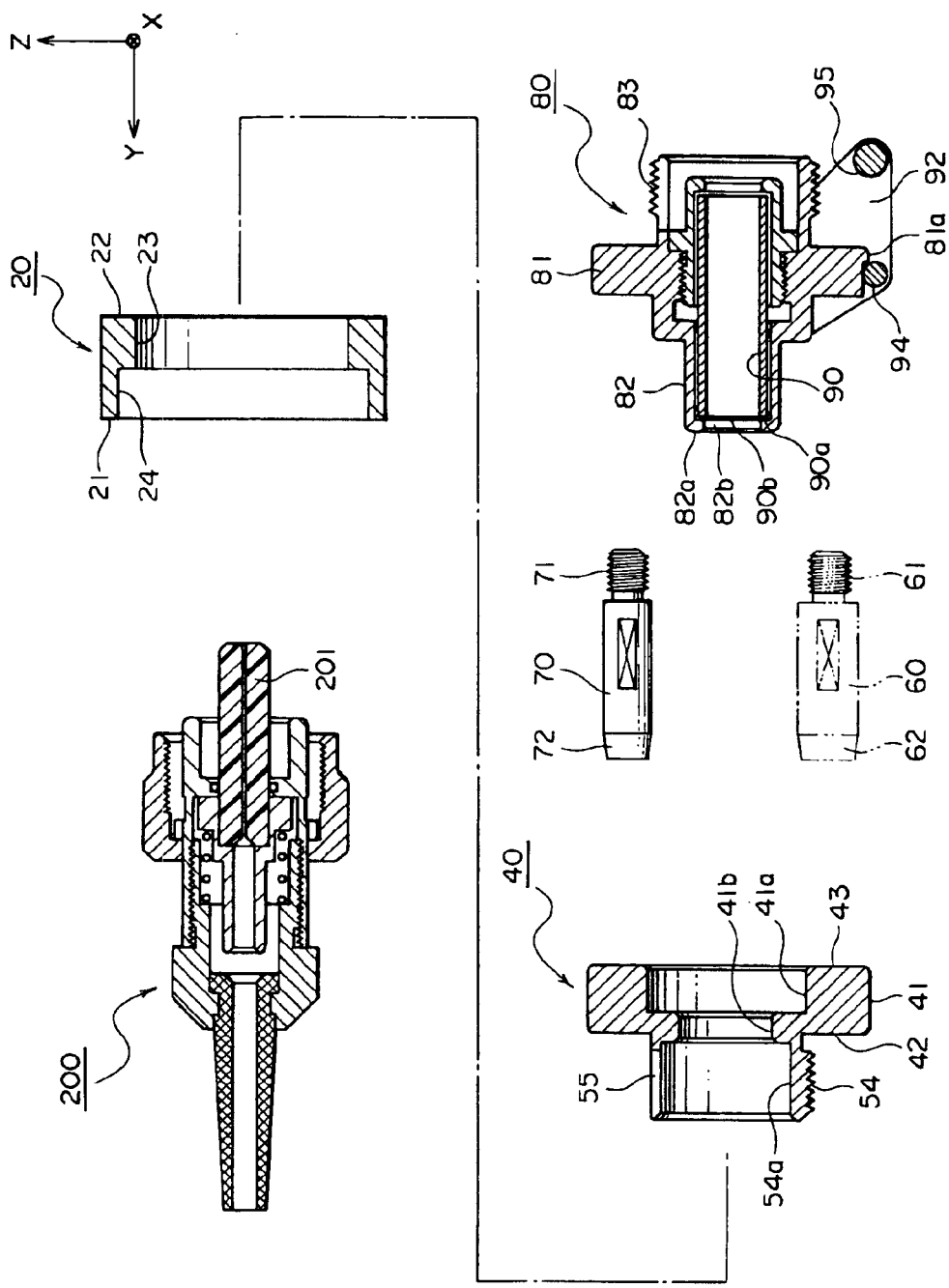
FIG. 4 is an exploded, cross-sectional view showing the adapter of FIG. 1, taken along lines IV—IV.
Figure 5:
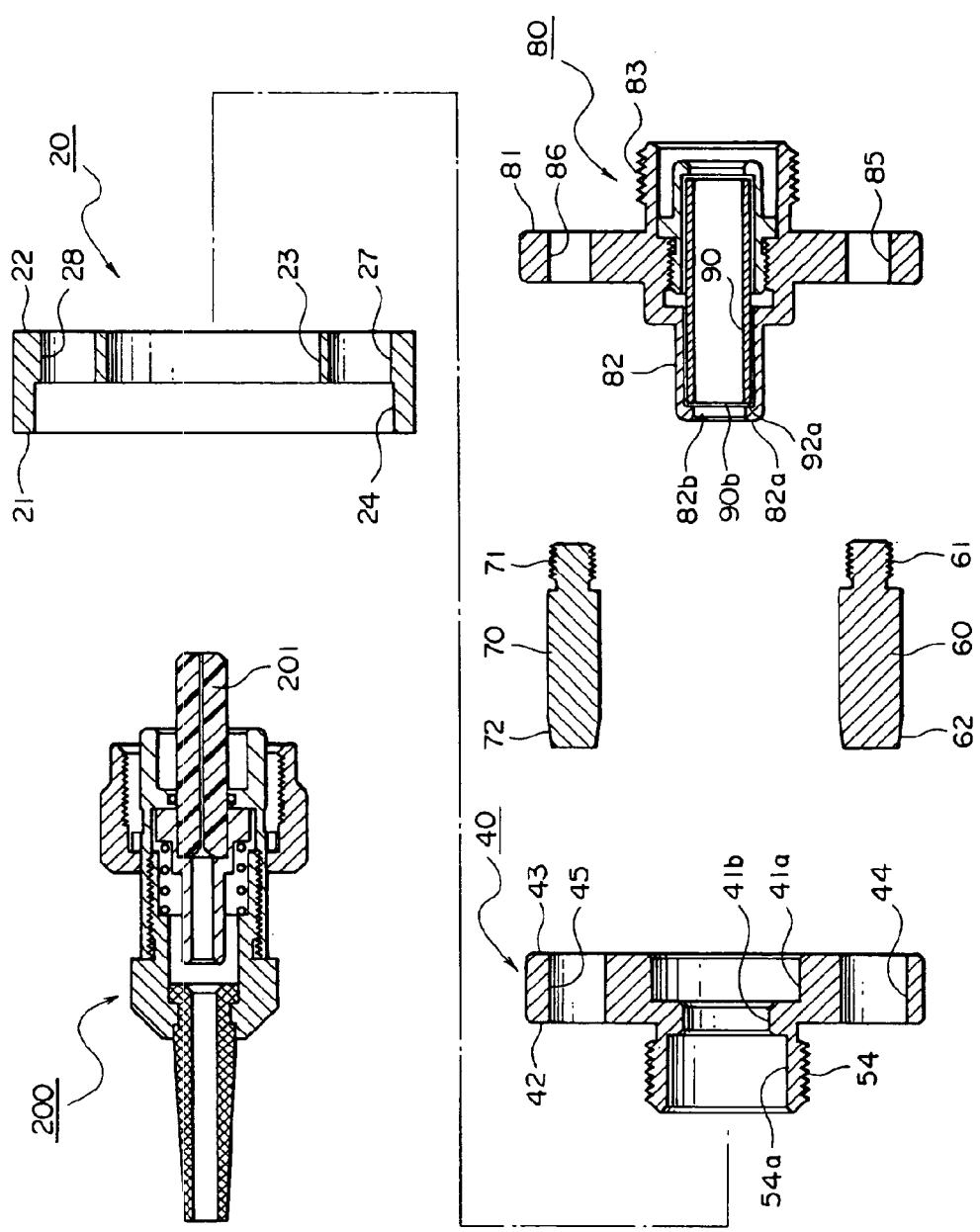
FIG. 5 is a cross sectional view showing the adapter of FIG. 1, taken along lines V—V.
Figure 6:
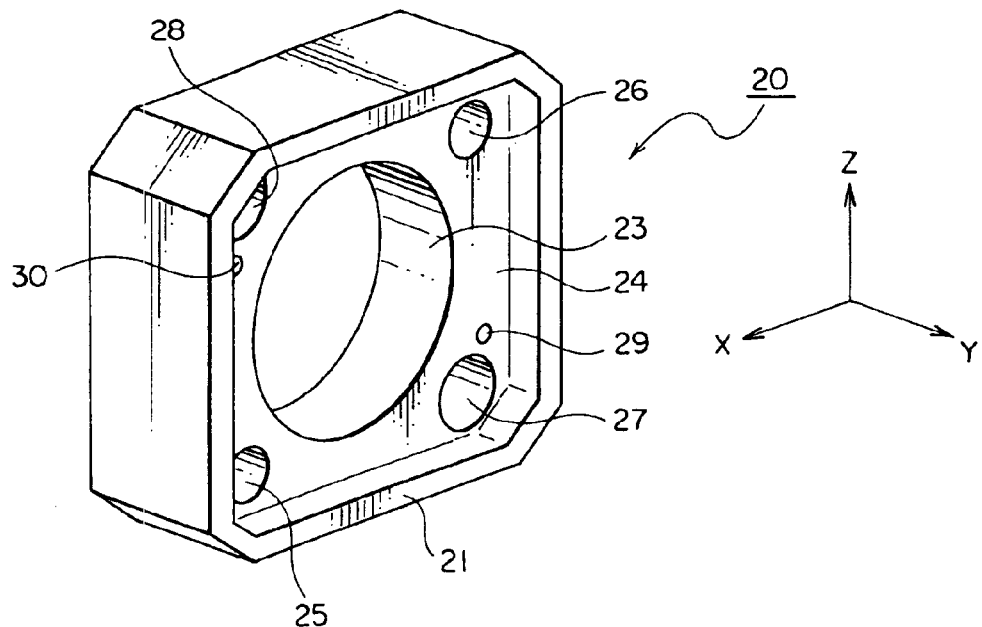
FIG. 6 is a perspective view showing a first part of a first member included in the adapter of FIG. 1, as seen in a line of sight opposite to that of FIG. 1.

With reference to FIGS. 1, 7, 10 to 13, the second part 40 comprises a base section 41, which has first and second ends 42, 43 in the Y-direction. The base section 41 has a generally quadrilateral external form. As shown in FIGS. 4 and 5, an opening 41a is formed in the second end 43 of the base section 41. The opening 41a is positioned at the center of the second end 43 of the base section 41 in the ZX plane. The opening 41a communicates with another opening 41b, which is formed in the base section 41 and has a diameter smaller than the opening 41a. The openings 41a, 41b are coaxially positioned.

As shown in FIGS. 1, 7, 10 to 13, the base section 41 is formed with two holes 44, 45. The holes 44, 45 are through holes. The holes 44, 45 constitute the first and the second positioning holes, respectively, together with the holes 27, 28 of the first part 20. In other words, the first positioning hole is comprised of the hole 27 of the first part 20 and the hole 44 of the second part 40, while the second positioning hole is comprised of the hole 28 of the first part 20 and the hole 45 of the second part 40. The hole 44 is larger than the hole 45. The holes 44, 45 of the second part 40 have the same diameters as the respective holes 27, 28 of the first part 20. Therefore, the first positioning hole has a larger diameter than that of the second positioning hole, and the first and the second positioning holes extend straightly in the Y-direction, as seen from FIG. 3. The first and the second positioning holes are arranged diagonally so that the openings 41a, 41b are positioned between the first and the second positioning holes, as seen from FIG. 5.

Figure 11:
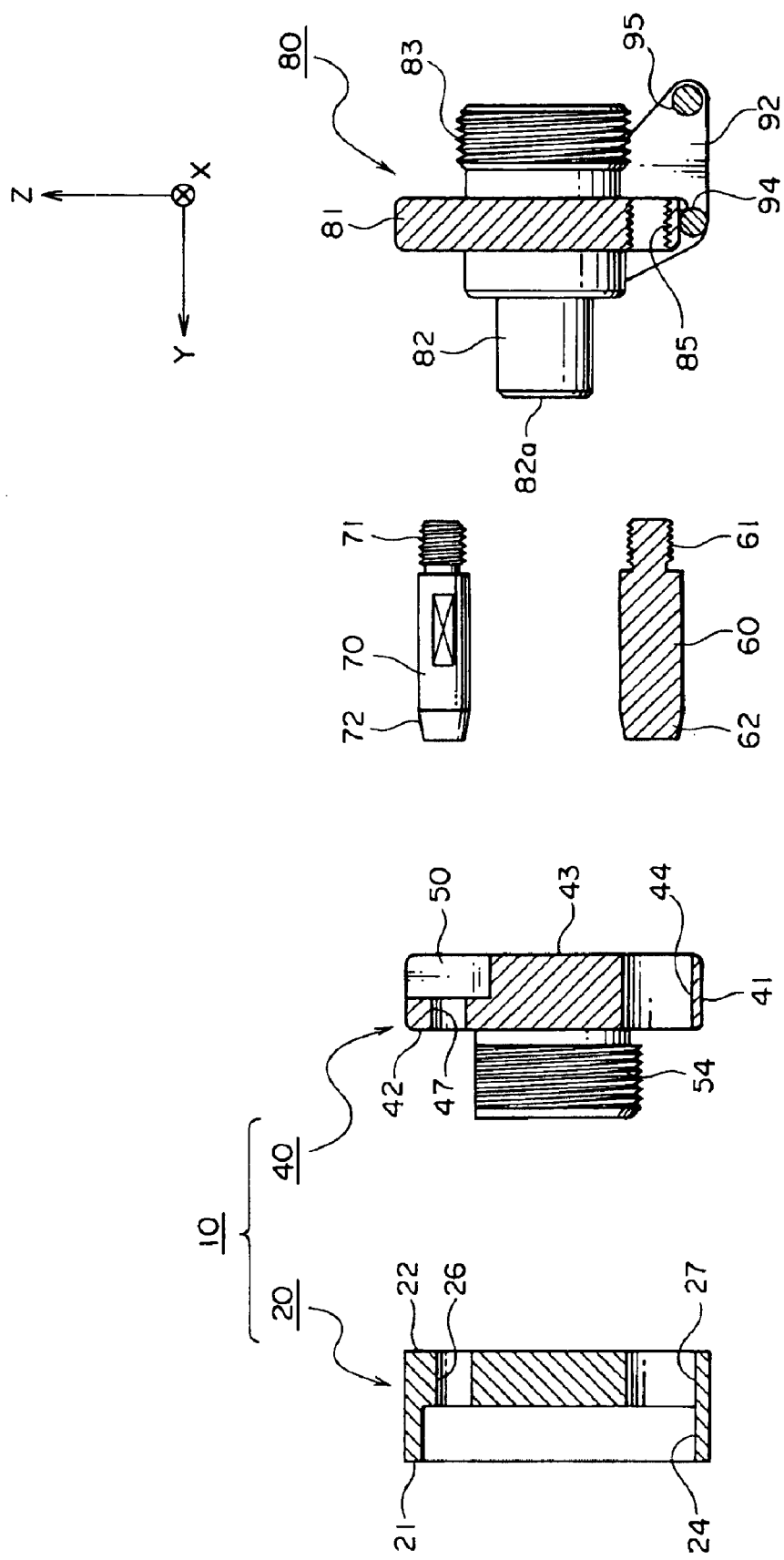
FIG. 11 is an exploded, partially-sectional, side view showing the adapter of FIG. 1, taken along lines XI—XI.
Figure 12:
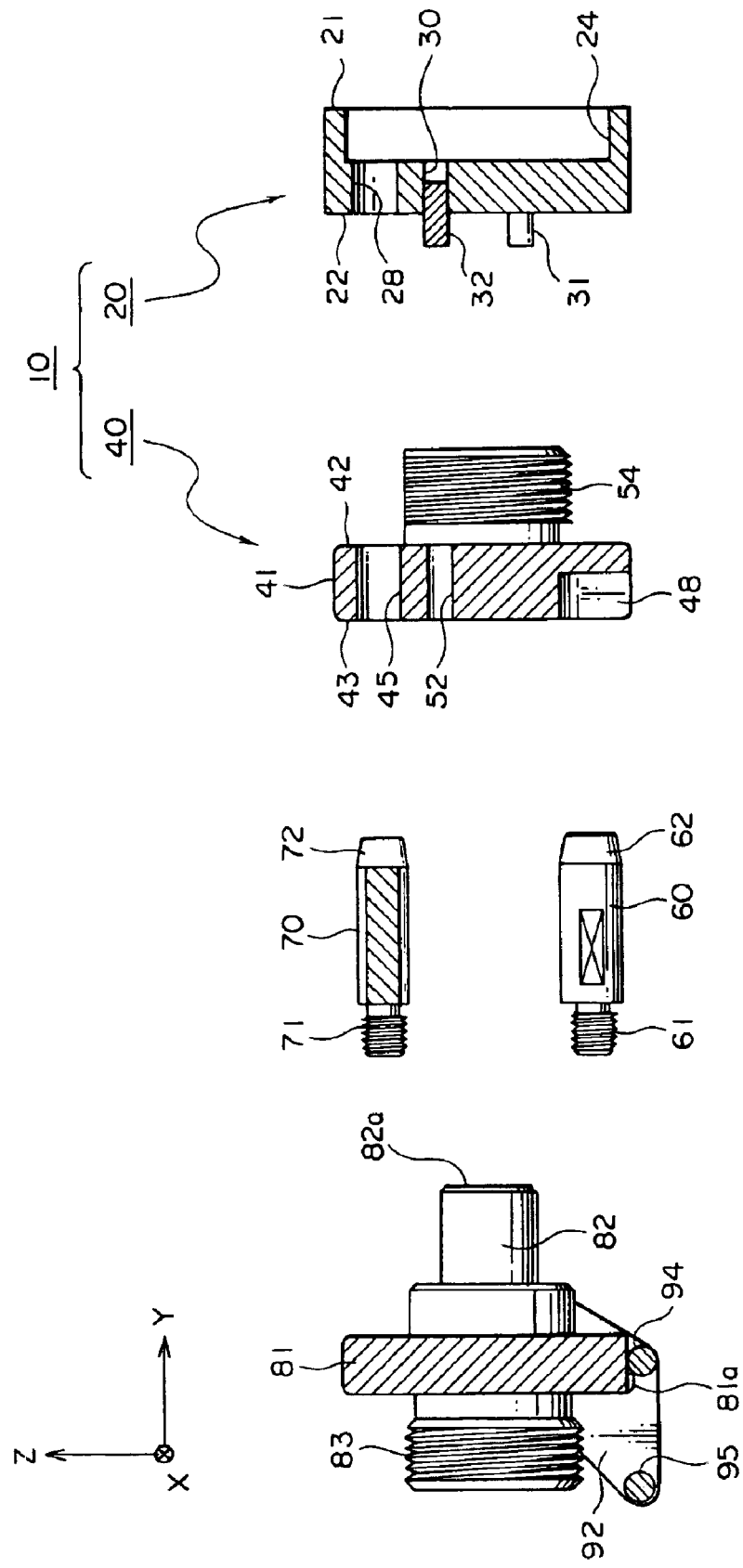
FIG. 12 is another exploded, partially-sectional, side view showing the adapter of FIG. 1, taken along lines XII—XII.
Figure 13:
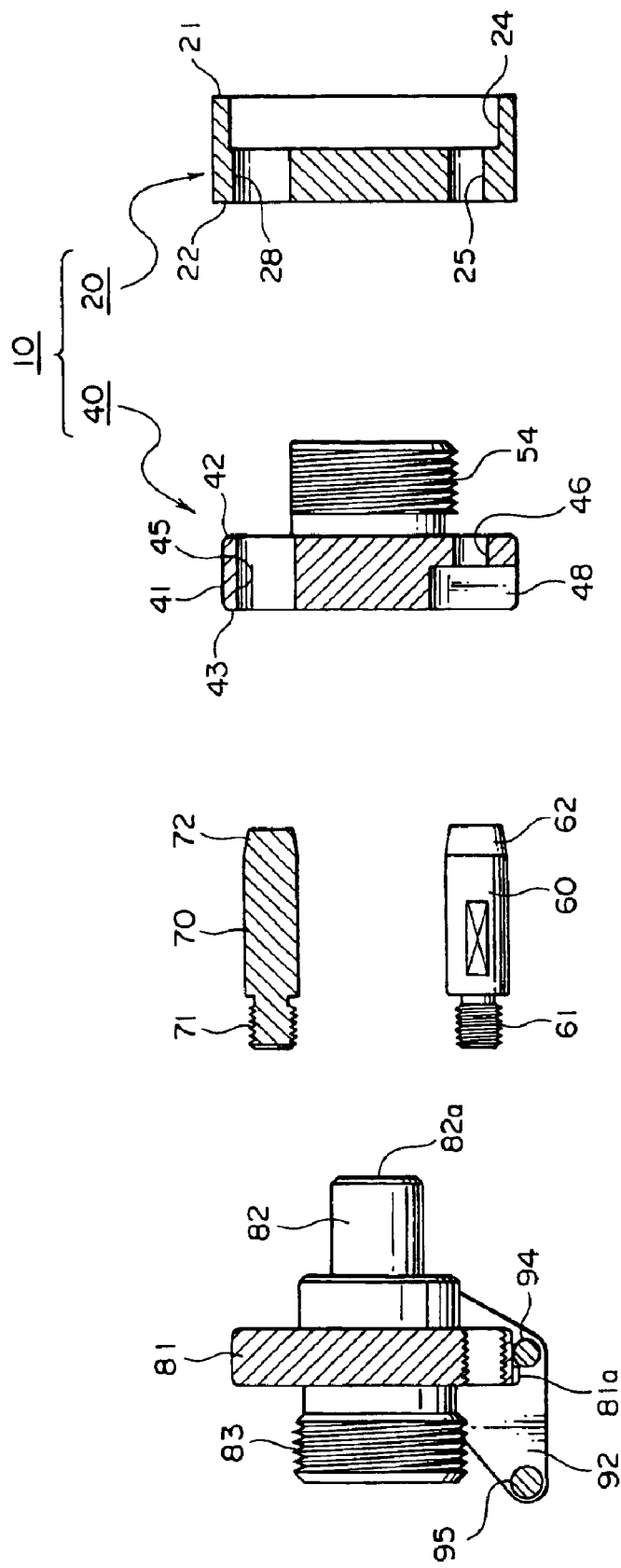
FIG. 13 is another exploded, partially-sectional, side view showing the adapter of FIG. 1, taken along lines XIII—XIII.

The base section 41 of the second part 40 is further provided with two holes 47, 48, which constitute the screw holes in cooperation with the holes 25, 26 of the first part 20. The screw holes are continuously formed with accommodation portions 48, 50, respectively, as shown in FIGS. 1, 11 and 13. The accommodation portions 48, 50 accommodate the heads of the screws inserted into the screw holes. The screws serve to fix the first and the second parts 20, 40 to each other while the first end 21 of the first part 20 is fixed on a backboard of an instrument. For example, see JP-B 3000342.

The base section 41 is also provided with through holes 51, 52, which are very narrower than others, as shown in FIG. 1. The through holes 51, 52 are positioned near to the respective holes 44, 45 and correspond to the holes 29, 30 of the first part 20. The through holes 51, 52 serve to fitly receive the respective projections 31, 32 so that the first and the second parts 20, 40 are suitably positioned with respect to each other and are fixed to each other, as understood from FIGS. 10 and 12. The holes 51, 52 may not be through holes.

Figure 7:
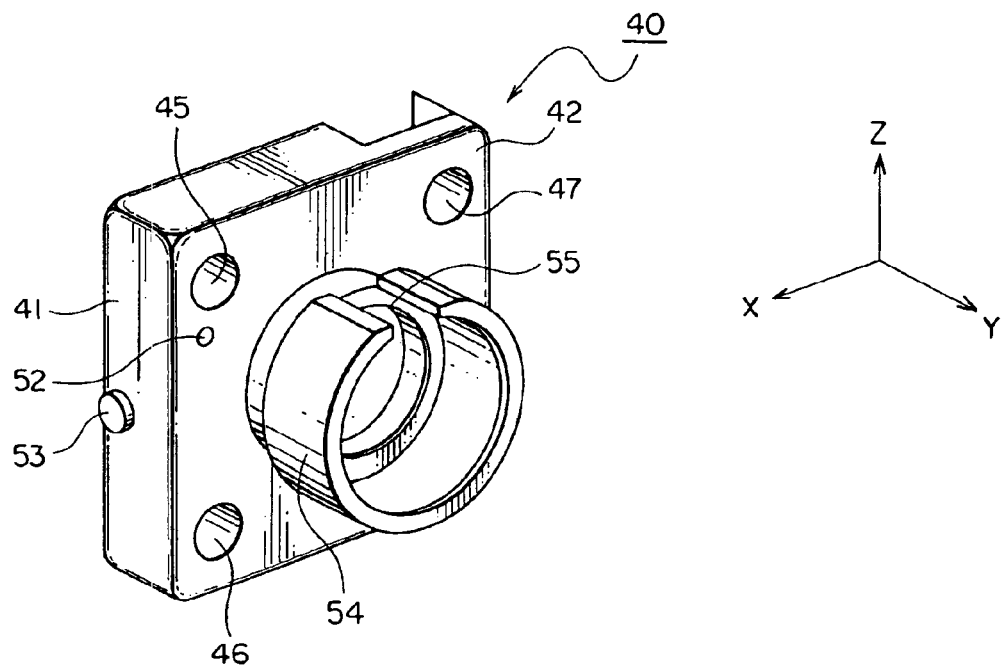
FIG. 7 is a perspective view showing a second part of the first member included in the adapter of FIG. 1, as seen in the same line of sight as FIG. 6.

The base section 41 is provided with two lateral projections 53, as shown in FIGS. 1 and 7. The lateral projections 53 project from the opposite side surfaces of the base section 41 in the X-direction. In the Z-direction, the lateral projections 53 are positioned at the middles of the respective side surfaces of the base section 41. In the Y-direction, the lateral projections 53 are positioned nearer to the second end 43 than to the first end 42 of the base section 41.

From the base section 41, a cylinder-like projection section 54 projects in the Y-direction, as especially shown in FIGS. 4 and 5. The cylinder-like projection section 54 defines an opening 54a, which communicates with the opening 41b and with the opening 41a, accordingly. As shown in FIG. 2, under the assembled state of the first and the second parts 20, 40, the cylinder-like projection section 54 is positioned within the circular hole 23 and the aperture 24, while the opening 54a constitutes a first member's opening for receiving the optical fiber connector 200. The cylinder-like projection section 54 is sized to surround the inner cylindrical portion 203 of the optical fiber connector 200. The outer periphery of the cylinder-like projection section 54 is threaded and is sized so that the outer cylindrical portion 204 is screwed to the outer surface of the cylinder-like projection section 54. As shown in FIG. 7, the cylinder-like projection section 54 is provided with a key groove 55 which is sized to suitably receive the key 202 of the optical fiber connector 200 to ensure the correct connection of the optical fiber connector 200 and the adapter 100.

Figure 3:
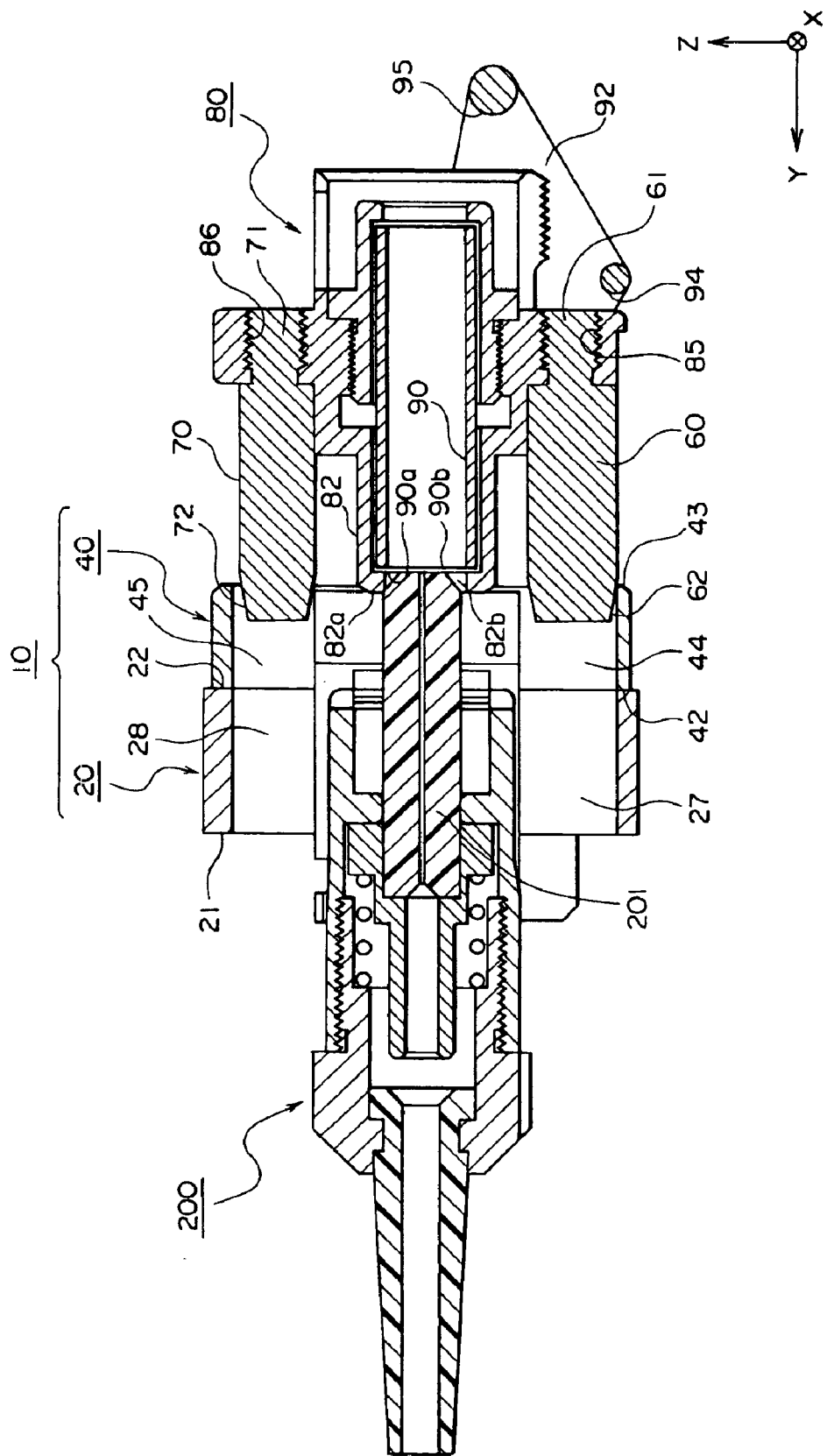
FIG. 3 is a cross sectional view showing the adapter of FIG. 1, taken along lines III—III.

As shown in FIGS. 1 to 5 and 10 to 13, the adapter 100 further comprises first and second positioning sticks 60, 70. Each of the first and second positioning sticks 60, 70 has two ends 61, 71, 62, 72. One end 61 of the first positioning stick 60 is threaded. The other end of the first positioning stick 60 is tapered. Likewise, one end 71 of the second positioning stick 70 is threaded, while the other end 72 of the second positioning stick 70 is tapered. The first positioning stick 60 has a diameter larger than that of the second positioning stick 70. The diameter of the first positioning stick 60 is sized so that the first positioning hole (27, 44) is able to smoothly receive the first positioning stick 60 but the second positioning hole (28, 45) is unable to receive the first positioning stick 60. In this embodiment, the diameter of the first positioning stick 60 is designed so that the diameter of the first positioning hole (27, 44) is substantially equal to the diameter of the first positioning stick 60 but is slightly larger than the diameter of the first positioning stick 60. The diameter of the second positioning stick 70 is sized so that the second positioning hole (28, 45) is able to smoothly receive the second positioning stick 70. In this embodiment, the diameter of the second positioning stick 70 is designed so that the diameter of the second positioning hole (28, 45) is substantially equal to the diameter of the second positioning stick 70 but is slightly larger than the diameter of the second positioning stick 70. The first and the second positioning sticks 60, 70 are fitted to a second member 80, as shown in FIGS. 2 and 3.

Figure 8:
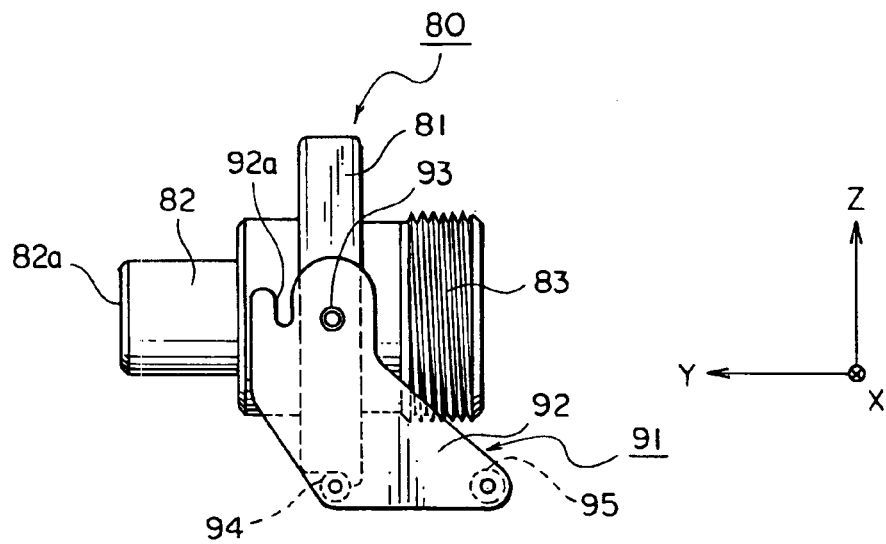
FIG. 8 is a side view showing a second member included in the adapter of FIG. 1.
Figure 9:
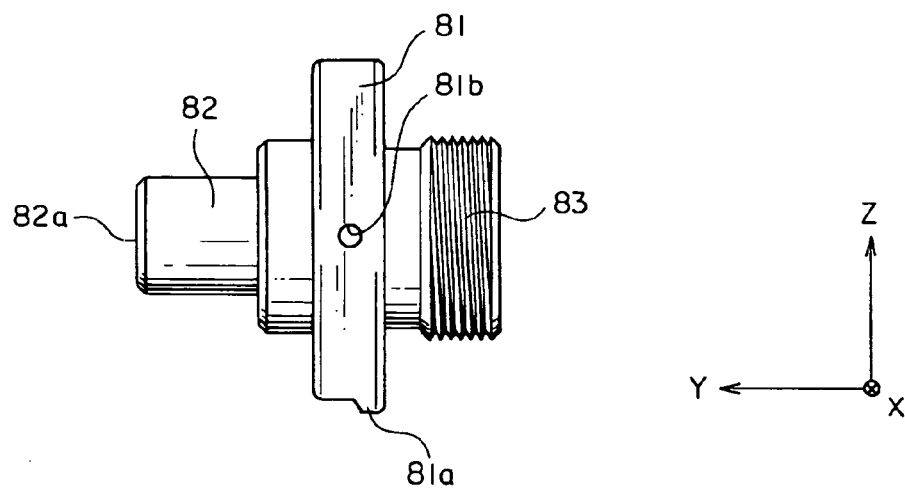
FIG. 9 is a side view showing the second member of FIG. 1, wherein a handle of the second member is omitted.
Figure 10:
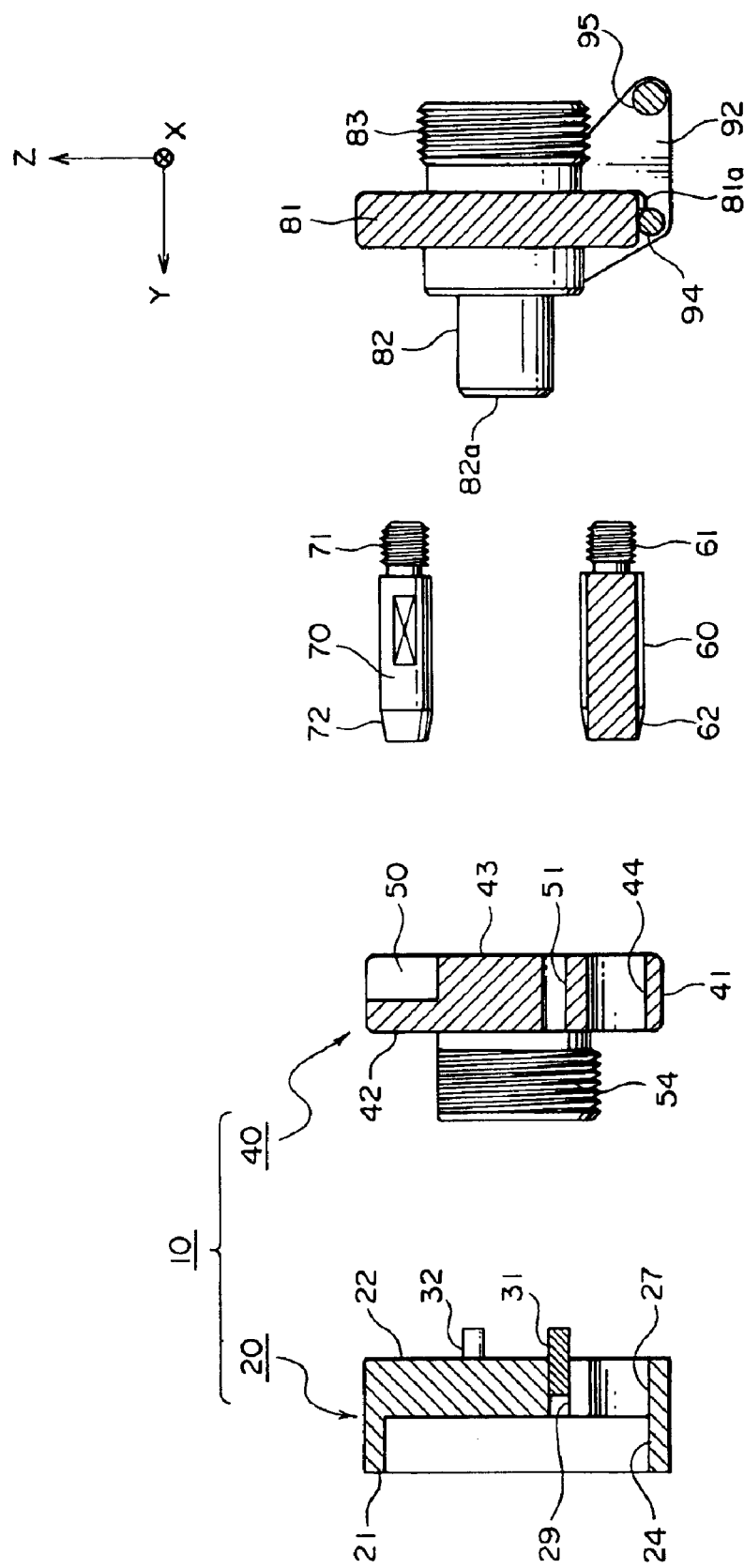
FIG. 10 is an exploded, partially-sectional, side view showing the adapter of FIG. 1, taken along lines X—X.

With reference to FIGS. 1 to 5 and 8 to 13, especially, FIGS. 8 and 9, the second member 80 comprises a base portion 81, a projection portion 82 and another cylinder-like projection portion 83. The base portion 81 has a generally quadrilateral external form and is formed with a protrusion line 81a and two holes 81b. The protrusion line 81 extends the X-direction and is positioned on the bottom of the base portion 81. The holes 81b are formed in the opposite sides of the base portion 81. From one end of the base portion 81, the projection portion 82 projects in the Y-direction. From the other end of the base portion 81, the cylinder-like projection portion 83 projects in the Y-direction but in the opposite direction of the projecting direction of the projection portion 82.

As shown in FIGS. 2 and 3, the projection portion 82 has an end 82a which defines an opening 82b. The outer periphery of the projection portion 82 is sized to be smoothly received and surrounded by the opening 41b of the first member 10 and the inner cylindrical portion 203 of the optical fiber connector 200.

As seen from FIGS. 1 and 7, the cylinder-like projection portion 83 has a shape similar to the cylinder-like projection section 54 of the first member 10. In detail, the cylinder-like projection portion 83 has a key groove 84 and the outer periphery of the cylinder-like projection portion 83 is threaded to be able to be connected with the other optical fiber connector, which is not shown in the drawings.

As shown in FIGS. 1 and 3, the base portion 81 of the second member 80 is formed with two holes 85, 86 whose inside surfaces are threaded. The ends 61, 71 of the first and the second positioning sticks 60, 70 are screwed into the respective holes 85, 86 of the second member 80 so that the first and the second positioning sticks 60, 70 project in the Y-direction. The first and the second positioning sticks 60, 70 are arranged parallel to each other, as best shown in FIG. 3.

As shown in FIGS. 1 to 3, the second member 80 accommodates and holds a sleeve 90 so that the sleeve 90 extends in the Y-direction. As shown in FIGS. 2 and 3, the sleeve 90 has two ends. One end 90a of the sleeve 90 defines an opening 90b. Also, the other end of the sleeve 90 defines another opening. These openings 90a are sized to smoothly receive the ferrules 201 of the optical fiber connectors 200. The sleeve 90 is partially covered by the projection portion 82 of the second member 80, and the end 90a of the sleeve 90 is positioned inside the end 82a of the projection portion 82. Under the state where the sleeve 90 is partially covered by the projection portion 82, the sleeve 90 has to be able to receive the ferrule 201 of the optical fiber connector. Therefore, the opening 82b at the end 82a of the projection portion 82 is sized to be able to receive the ferrule 201.

As best shown in FIG. 8, the second member 80 is provided with an engagement handler 91. The engagement handler 91 has a pair of plate portions 92. Each of the plate portions 92 is formed with a hook portion 92a, which has a U like pocket shape. The hook portion 92a is sized to be able to tightly catch the corresponding lateral projection 53. The plate portion 92 is rotatably fixed to the side of the base portion 81 by a shaft 93 which is inserted and fitted into the hole 81b of the base portion 81. The plate portion 92 can rotate around the shaft 93. By the rotational operation of the plate portion 92, the hook portion 92a catches and releases the corresponding lateral projection 53.

The plate portions 92 are also connected to each other by the rollers 94, 95. The rollers 94, 95 extend in the X-direction. The roller 95 serves as a handle bar which is actually taken and operated by the user. The operation of the roller 95 makes the rotation of the plate portions 92. The roller 94 is engaged with the protrusion line 81a by the rotation of the plate portions 92. At that time, the hook portions 92a catch the respective lateral projections 53 of the first member so that the first and the second members 10, 80 are coupled together.

As best shown in FIG. 2, in the Y-direction, the first and the second positioning sticks 60, 70 project beyond the end 82a of the projection portion 82 and beyond the end 90a of the sleeve, accordingly.

In this embodiment, the ferrule 201 of the optical fiber connector 200 projects from the second end 43 of the second part 40 by a predetermined length, as seen from FIG. 2. However, the predetermined length is smaller than the differences between the ends 62, 72 of the first and the second positioning sticks 60, 70 and the end 82a of the projection portion 82. Accordingly, the predetermined length is also smaller than the differences between the ends 62, 72 of the first and the second positioning sticks 60, 70 and the end 90a of the sleeve 90. Therefore, the ferrule 201 can be prevented from being damaged due to the undesirable contact.

When the second member 80 is intended to be fitted with the first member 10, the first and the second positioning sticks 60, 70 bump against the second end 43 of the second part 40 unless the first and the second positioning sticks 60, 70 are inserted into the first and the second positioning holes, respectively. If the first and the second positioning sticks 60, 70 are inserted into the first and the second positioning holes, respectively, the projection portion 82 and the sleeve 90 are suitably positioned so that the ferrule 201 of the optical fiber connector can be smoothly inserted and received in the sleeve 90.

In addition, upon the assemble of the first and the second members 10, 80, the first and the second positioning sticks are inserted into the first and the second positioning holes, respectively, until the base portion 81 is in contact with the second end of the second part 40 of the first member 10. The lengths of the first and the second positioning sticks 60, 70 are sized so that the first and the second positioning sticks 60, 70 are accommodated within the first member 10 and do not project beyond the first end 21 of the first part 20 of the first member 10. In other words, the distance between the both ends 21, 43 of the first member 10 is larger than the projecting lengths of the first and the second positioning sticks 60, 70 with respect to the base portion 81. Therefore, the backboard of the instrument, where the first member 10 is fitted, does not need to have holes for receiving the first and the second positioning sticks 60, 70.

What is claimed is:

1. An adapter for coupling first and second optical fiber connectors each of which has a ferrule, the adapter comprising:
   a first member, which has first and second ends in a first direction, wherein the first end is formed with a first opening for receiving the first optical fiber connector, the second end is formed with a second opening, the second opening communicates with the first opening in the first direction, the first member is formed with first and second positioning holes, the first and the second positioning holes extend from the second end in the first direction;
   a sleeve, which has first and second open ends for receiving the ferrules of the first and the second optical fiber connectors, respectively, so that the ferrules abut; and
   a second member for receiving the second optical fiber connector, wherein the second member holds the sleeve, the sleeve extends in a second direction, the second member is to be detachably coupled to the first member while the first and the second directions are aligned with each other, the second member is provided with first and second positioning sticks, the first and the second positioning sticks extend in the second direction and project beyond the first open end of the sleeve in the second direction, and the first and the second positioning sticks are inserted into the first and the second positioning holes, respectively, when the first and the second members are coupled together;
   wherein the first and the second positioning holes have diameters different from each other, and the first and the second positioning sticks have diameters corresponding to the diameters of the first and the second positioning holes, respectively, and
   wherein the second member has two threaded holes, the first and the second positioning sticks have threaded portions, respectively, and the threaded portions are screwed into the threaded holes, respectively, such that the first and the second positioning sticks are adapted to attach to the second member.

2. The adapter according to claim 1, wherein: the second member is formed with a projection portion which projects in the second direction; the projection portion partially covers the sleeve so that the first open end of the sleeve is positioned within the projection portion; and the first and second positioning sticks extend beyond the projection portion in the second direction.

3. The adapter according to claim 1, wherein a length from the second end of the first member to an end of the ferrule of the first optical fiber connector when the first optical fiber connector is fitted to the first member is defined as a first length; the first length is less than distances between ends portions of the first and the second positioning sticks in the first and the second directions and the first open end of the sleeve.

4. The adapter according to claim 3, wherein the first length is also less than distances between ends portions of the first and the second positioning sticks and an associated end of the projection portion in the first and the second directions.

5. The adapter according to claim 1, wherein the first and the second positioning holes extend to the first end of the first member.

6. The adapter according to claim 1, wherein end portions of the first and the second positioning sticks are accommodated within the first member and do not project from the first end of the first member when the first and second members are coupled together.

7. The adapter according to claim 1, wherein end portions of the first and the second positioning sticks are tapered.

8. The adapter according to claim 1, wherein the second opening is positioned between the first and the second positioning holes in a direction perpendicular to the first direction.

9. The adapter according to claim 1, wherein the first member is provided with lateral projections, while the second member is provided with hook portions, which are engaged with the respective lateral projections when the first and the second members are coupled together.

10. The adapter according to claim 1, wherein the first member is provided with two through holes, the through holes extending in the first direction and adapted to receive screws when the first member is fixed to a panel by the use of the screws.

11. The adapter according to claim 10, wherein the through holes are formed integral with accommodation portions for accommodating heads of the screws.

12. The adapter according to claim 1, wherein: the first member comprises first and second parts separated from each other; the first part has an end constituting the first end of the first member; the end of the first part comprises an aperture; the second part is comprised of a base section and a cylinder-like projection section; the base section has another end, which constitutes the second end of the first member and comprises the second opening; the cylinder-like projection section projects from the base section and is surrounded by the aperture of the first part; the cylinder-like projection section defines the first opening of the first member and is adapted to receive the first optical fiber connector; and the second opening communicates with an inside of the cylinder-like projection section.

* * * * *